(12) United States Patent
Kang et al.

(10) Patent No.: US 9,187,633 B2
(45) Date of Patent: Nov. 17, 2015

(54) OPTICAL FILM AND METHOD OF MANUFACTURING THE SAME

(71) Applicant: LG CHEM, LTD., Seoul (KR)

(72) Inventors: Byoung-Il Kang, Daejeon (KR); Chan-Hong Lee, Daejeon (KR); Chang-Hun Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 11 days.

(21) Appl. No.: 14/268,467

(22) Filed: May 2, 2014

(65) Prior Publication Data

US 2014/0239523 A1 Aug. 28, 2014

Related U.S. Application Data

(62) Division of application No. 12/678,459, filed as application No. PCT/KR2008/005489 on Sep. 17, 2008, now Pat. No. 8,758,655.

(30) Foreign Application Priority Data

Sep. 17, 2007 (KR) ........................ 10-2007-0094052

(51) Int. Cl.

| | |
|---|---|
| *B29D 7/01* | (2006.01) |
| *C08L 51/04* | (2006.01) |
| *C08L 31/02* | (2006.01) |
| *C08L 51/00* | (2006.01) |
| *C08J 5/18* | (2006.01) |
| *C08L 33/14* | (2006.01) |
| *G02B 5/30* | (2006.01) |
| *B29D 11/00* | (2006.01) |
| *C08L 37/00* | (2006.01) |
| *C08L 39/04* | (2006.01) |

(52) U.S. Cl.
CPC ........... *C08L 51/00* (2013.01); *B29D 11/00788* (2013.01); *C08J 5/18* (2013.01); *C08L 33/14* (2013.01); *C08L 37/00* (2013.01); *C08L 39/04* (2013.01); *G02B 5/3083* (2013.01); *C08J 2333/06* (2013.01); *C08L 51/04* (2013.01); *G02F 2201/50* (2013.01)

(58) Field of Classification Search
CPC ....... G02B 5/3083; C08L 51/00; C08L 51/04; C08L 33/04; C08J 5/18; B29D 11/00788
See application file for complete search history.

(56) References Cited

U.S. PATENT DOCUMENTS

| | | |
|---|---|---|
| 5,186,993 A | 2/1993 | Hallden-Abberton et al. |
| 5,256,733 A | 10/1993 | Fleischer et al. |
| 5,959,033 A | 9/1999 | Demirors et al. |
| 6,908,670 B1 | 6/2005 | Maekawa |
| 7,446,462 B2 | 11/2008 | Lim et al. |
| 7,572,490 B2 | 8/2009 | Park et al. |
| 8,911,854 B2 * | 12/2014 | Kang et al. .................. 428/212 |
| 2004/0147674 A1 | 7/2004 | Kakeda et al. |
| 2007/0078221 A1 | 4/2007 | Choi et al. |
| 2007/0229995 A1 | 10/2007 | Kawato et al. |
| 2007/0243364 A1 | 10/2007 | Maekawa et al. |
| 2008/0266493 A1 | 10/2008 | Yonezawa et al. |
| 2009/0021834 A1 | 1/2009 | Iwata et al. |
| 2010/0168340 A1 | 7/2010 | Ueda et al. |
| 2010/0202050 A1 | 8/2010 | Kang et al. |
| 2011/0097561 A1 | 4/2011 | Kang et al. |
| 2011/0183149 A1 | 7/2011 | Kang et al. |
| 2012/0003402 A1 | 1/2012 | Ohashi et al. |

FOREIGN PATENT DOCUMENTS

| | | |
|---|---|---|
| EP | 1930748 | 6/2008 |
| JP | H01-304402 A | 12/1989 |
| JP | 02-043023 | 2/1990 |
| JP | 03-194503 | 8/1991 |
| JP | H04-233964 A | 8/1992 |
| JP | 05-119217 | 5/1993 |
| JP | 2000-178365 A | 6/2000 |
| JP | 2003-261736 | 9/2003 |
| JP | 2005-248125 | 9/2005 |
| JP | 2006-096960 A | 4/2006 |
| JP | 2006-111729 A | 4/2006 |
| JP | 2006-160854 | 6/2006 |
| JP | 2006-241263 A | 9/2006 |
| JP | 2007-031537 | 2/2007 |
| JP | 2007-178504 A | 7/2007 |
| JP | 2009-501830 | 1/2009 |
| KR | 10-1999-0036706 | 5/1999 |
| KR | 10-2005-0106716 A | 11/2005 |
| KR | 10-2006-0094160 A | 8/2006 |
| KR | 10-2007-0032710 A | 3/2007 |
| WO | 02/092696 A1 | 11/2002 |
| WO | 2005105918 | 11/2005 |
| WO | 2006/088202 A1 | 8/2006 |
| WO | 2006/090700 | 8/2006 |
| WO | 2007/026659 | 3/2007 |
| WO | 2007-032304 A1 | 3/2007 |
| WO | 2007/043356 | 4/2007 |
| WO | 2007099826 | 9/2007 |

OTHER PUBLICATIONS

Machine translation of KR10-2005-0106716.*
Machine translation of KR10-2005-0106716 (Jun. 2012).*

* cited by examiner

*Primary Examiner* — Irina S Zemel
*Assistant Examiner* — Jeffrey Lenihan
(74) *Attorney, Agent, or Firm* — Dentons US LLP

(57) ABSTRACT

The present invention provides an optical film and a retardation film that each include an acryl resin, and 20 to 65 parts by weight of a graft copolymer including a conjugated diene rubber based on 100 parts by weight of the acryl resin, and an electronic device including the same.

5 Claims, No Drawings

OPTICAL FILM AND METHOD OF MANUFACTURING THE SAME

This application is a divisional of U.S. application Ser. No. 12/678,459, filed Mar. 16, 2010, which is a 35 U.S.C. §371 National Stage entry of International Application No. PCT/KR2008/005489, filed on Sep. 17, 2008, and claims priority to Korean Application No. 10-2007-0094052, filed on Sep. 17, 2007, which are all hereby incorporated by reference in their entireties.

TECHNICAL FIELD

The present invention relates to an optical film, and a method of manufacturing the same. More particularly, the present invention relates to an optical film, in which the thermal stability and the toughness are significantly improved, and a method of manufacturing the same. The optical film can be usefully applied to an electronic device such as display devices including LCDs. This application claims priority from Korean Patent Application No. 10-2007-0094052 filed on Sep. 17, 2007 in the Korean Intellectual Property Office, the disclosure of which is incorporated herein by reference in its entirety.

BACKGROUND ART

In recent years, in accordance with the advance in optical technology, various types of display technologies such as plasma display panels (PDP), liquid crystal displays (LCD), organic/inorganic EL displays (ELD) and the like have been suggested and sold in the market instead of a known cathode-ray tube. In the above-mentioned displays, the use of various types of plastic films has been suggested and the required characteristics thereof have been sophisticated. For example, in the case of the liquid crystal displays, in order to obtain the slimness and the lightness and to improve display characteristics, various types of plastic films are used in a polarizing plate, a retardation film, a plastic substrate, a light guide plate.

In the case of the polarizing plate, in general, the polarizing plate has a structure in which the triacetyl cellulose film (hereinafter, referred to as TAC film) acting as the protective film is laminated by using the aqueous adhesive made of the polyvinyl alcohol aqueous solution on the polarizer. However, both the polyvinyl alcohol film used as the polarizer and the TAC film used as the protective film for polarizers have poor heat resistance and humidity resistance. Therefore, if the polarizing plate that is made of the films is used at a high temperature or a high humidity atmosphere for a long period of time, the degree of polarization is reduced, the polarizer and the protective film are separated from each other, or optical properties are reduced. Thus, in terms of the purposes, there are various limits. In addition, in the case of the TAC film, a change in in-plane retardation ($R_{in}$) and thickness retardation ($R_{th}$) is significant according to a change in the ambient temperature/humidity atmosphere. In particular, a change in retardation in respects to incident light at an inclined direction is significant. If the polarizing plate that includes the TAC film having the above-mentioned characteristics as the protective film is applied to a liquid crystal display, the viewing angle characteristics are changed according to the change in the ambient temperature/humidity atmosphere, thus reducing the image quality. In addition, in the case of the TAC film, a change in dimension is significant according to the change in the ambient temperature/humidity atmosphere and the photoelastic coefficient is relatively high, thus, after evaluation in respects to durability in a heat resistant and humidity resistant atmosphere, a change in retardation characteristic occurs locally, thereby easily reducing the image quality.

As a material to complement the disadvantages of the TAC film, a methacryl resin is well known. However, it is known that the methacryl resin is easily broken or splited to cause problems in terms of transportability during the production of the polarizing plate and the productivity is poor. In addition, in the case of when the acrylate resin is used as the material of the film, since it is required that a casting process is used, there are problems in that it is difficult to perform the production process and the cost is high.

In the case of the retardation film, the film that is made of the styrene resin is a material that shows the optical anisotropic property that the refractive index is increased perpendicular to the alignment direction when the film is stretched and aligned, and it is known that the film is stretched to be used for manufacturing the film having the positive thickness retardation ($R_{th}$). In addition, there are advantages in that the styrene resin has the excellent economic efficiency and transparency. However, there are problems in that the heat resistance is insufficienty and the mechanical properties are poor except for the case of when the costly special monomer is used to perform the manufacturing. In addition, in the case of when the polycarbonate resin is stretched to manufacture the retardation film, it is possible to provide the sufficient retardation function, but the change in retardation is significant in respects to the degree of stretching and it is difficult to provide the film having the uniform and stable retardation function.

DISCLOSURE OF INVENTION

Technical Problem

The present invention has been made keeping in mind the problems occurring in the related art, and an object of the present invention is to provide an optical film that can be easily manufactured by using an extrusion process at low cost, and has the excellent heat resistance and toughness, and a method of manufacturing the same. In the case of the optical film, since the optical isotropic properties are excellent before the stretching the film can be used for various types of purposes such as a polarizing plate protective film, and after the stretching, since it is possible to provide the uniform and stable retardation, the film can be applied to a retardation film. It is another object of the present invention to provide a retardation film that is manufactured by using the optical film and a method of manufacturing the same. It is still another object of the present invention to provide an electronic device that includes the optical film or retardation film.

Technical Solution

The present invention provides an optical film that includes an acryl resin, and 20 to 65 parts by weight of a graft copolymer including a conjugated diene rubber based on 100 parts by weight of the acryl resin.

In addition, the present invention provides a method of manufacturing an optical film, which includes a) preparing a resin composition that includes an acryl resin, and 20 to 65 parts by weight of a graft copolymer including a conjugated diene rubber based on 100 parts by weight of the acryl resin, and b) forming a film by using the resin composition.

In addition, the present invention provides a retardation film that is manufactured by stretching the optical film.

In addition, the present invention provides a method of manufacturing a retardation film, which includes a) preparing a resin composition that includes an acryl resin, and 20 to 65 parts by weight of a graft copolymer including a conjugated diene rubber component based on 100 parts by weight of the acryl resin, b) forming a film by using the resin composition, and c) uniaxially or biaxially stretching the film.

In addition, the present invention provides an electronic device that includes the optical film or retardation film.

Advantageous Effects

An optical film according to the present invention has the excellent heat resistance and toughness. Since the optical isotropic properties are excellent before the stretching the film can be used for various types of purposes such as a polarizing plate protective film, thus replacing a known costly TAC resin. After the stretching, since it is possible to provide the uniform and stable retardation, the film can be applied to a retardation film. In addition, since the optical film according to the present invention can be manufactured by using an extrusion process, the manufacturing method can be easily performed and the manufacturing cost is low. Accordingly, the film according to the present invention has the effect that is better than that of a known film that is made of only the acrylate resin.

BEST MODE FOR CARRYING OUT THE INVENTION

Hereinafter, the present invention will be described in detail.

An optical film according to the present invention includes an acryl resin and a graft copolymer that includes a conjugated diene rubber component.

Since it is required that a film material used in image display devices such as LCDs has high stability and heat resistance to ultraviolet rays, it is known that a conjugated diene compound having a double bond is not used. Accordingly, as the film material used for the purpose requiring heat resistance of image display devices such as LCDs and the like, an example in which an impact reducing substance including the conjugated diene rubber is used in a large amount of 20 to 65 parts by weight based on 100 parts by weight of an acryl resin that is a matrix resin is not known. However, the present inventors have found that in the case of when the conjugated diene rubber component is used as a copolymer having a predetermined stricture, when a component and a component ratio of the copolymer are controlled, the toughness of the film is improved according to the conjugated diene compound, and the reduction in stability and heat resistance that are known as problems of the known conjugated diene compound can be avoided.

In the present invention, the graft copolymer includes the conjugated diene rubber component in an amount of 20 to 65 parts by weight based on 100 parts by weight of the acryl resin that acts as a matrix. In the case of when the graft copolymer is included in an amount of less than 20 parts by weight, the toughness of the optical film is reduced, and in the case of when the amount is more than 65 parts by weight, there are problems in that it is difficult to process the film, the haze of the film is increased, and the glass transition temperature is reduced.

In the present invention, it is preferable that the graft copolymer including the conjugated diene rubber is the graft copolymer of a conjugated diene rubber component and an acryl resin. The type of the graft copolymer is not limited, but it is preferable that the graft copolymer have a core-shell structure in which the conjugated diene rubber component constitutes a core and an acryl resin constitutes a shell.

In the graft copolymer, a weight ratio of the conjugated diene rubber component and the acryl resin is in the range of preferably 10 to 50:90 to 50, and more preferably 15 to 45:85 to 55. In the graft copolymer, in the case of when the weight ratio of the conjugated diene rubber component is less than 10% by weight, there is a problem in that the toughness of the optical film is not sufficient. In the case of when the weight ratio is more than 50% by weight, the dispersibility is reduced to rapidly increase the haze and the thermal expansion coefficient and reduce the glass transition temperature.

Among the graft copolymers, examples of the conjugated diene rubber component are not limited, but may include a butadiene copolymer such as an ethylene-propylene diene rubber, a butadiene rubber, a styrene-butadiene rubber and the like, and it is more preferable to use the butadiene rubber.

Among the graft copolymers, examples of the acryl resin are not limited, but may include a homo or copolymer of the acryl monomer; a copolymer of an acryl monomer and an aromatic vinyl monomer; a copolymer of an acryl monomer, an aromatic vinyl monomer and an acrylonitrile monomer; a copolymer of an aryl monomer, an aromatic vinyl monomer and an acid anhydride; a copolymer of an acryl monomer, an aromatic vinyl monomer, an acrylonitrile monomer and an acid anhydride and the like.

A compound which has a double bond between a carbonyl group of an ester group and conjugated carbons may be used as the acryl monomer, and examples of a substituent group thereof is not limited. The acryl monomer that is described in the present specification includes acrylate and an acrylate derivative, and is a notion including alkyl acrylate, alkyl methacrylate, alkyl butacrylate and the like. For example, examples of the acryl monomer include a compound that is represented by the following Formula 1.

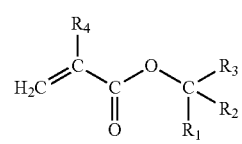

[Formula 1]

wherein $R_1$, $R_2$ and $R_3$ are each independently a hydrogen atom, or a monovalent hydrocarbon group that includes or not a hetero atom and has 1 to 30 carbon atoms, at least one of $R_1$, $R_2$ and $R_3$ may be an epoxy group, and $R_4$ is a hydrogen atom or an alkyl group having 1 to 6 carbon atoms.

Specific examples of the acryl monomer may include one or more acryl monomers selected from the group consisting of methyl acrylate, ethyl acrylate, methyl methacrylate, ethyl methacrylate, methyl ethacrylate, and ethyl ethacrylate, and in particular, it is most preferable to use methyl methacrylate (MMA).

It is preferable that a monomer having a structure in which a benzene nucleus is substituted or unsubstituted with one or more $C_1$ to $C_5$ alkyl groups or halogen groups be used as the aromatic vinyl monomer. For example, it is preferable that one or more styrene monomers selected from the group consisting of styrene or α-methyl styrene be used.

Preferable examples of the acrylonitrile monomer include one or more acrylonitrile monomers selected from the group consisting of acrylonitrile, methaacrylonitrile, and ethaacrylonitrile.

The carboxylic acid anhydride may be used as the acid anhydride, and monovalent or polyvalent carboxylic acid anhydride including divalanet carboxylic acid anhydride may be used. Preferably, maleic acid anhydride or a derivative thereof may be used, and for example, a compound that is represented by the following Formula 2 may be used.

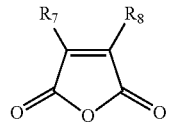

[Formula 2]

wherein $R_7$ and $R_8$ are each independently hydrogen atom or an alkyl group having 1 to 6 carbon atoms.

In the present invention, among the graft copolymers, in the case of when a copolymer of the acryl monomer, the aromatic vinyl monomer, and the acrylonitrile monomer, or a copolymer of the acryl monomer, the aromatic vinyl monomer and the acid anhydride as the acryl resin, is is preferable that the weight ratio be in the range of 55 to 80:10 to 35:4 to 15.

The conjugated diene rubber component and the acryl resin may be subjected to graft polymerization by using a method that is known in the art, and for example, a general emulsification polymerization method may be used. It is preferable that the graft ratio be in the range of 30 to 60%. The particle size of the core including the conjugated diene rubber component is in the range of preferably 150 to 400 nm and more preferably 200 to 300 nm, but the scope of the present invention is not limited thereto.

In the present invention, a substance that is known in the art may be used as the acryl resin that acts as the matrix of the optical film. In particular, it is preferable to use a homo or copolymer of the acryl monomer; a copolymer of the acryl monomer and the aromatic vinyl monomer; a copolymer of the acryl monomer, the aromatic vinyl monomer and the acrylonitrile monomer; a copolymer of the acryl monomer, the aromatic vinyl monomer and the acid anhydride; or a copolymer of the acryl monomer, the aromatic vinyl monomer, the acrylonitrile monomer and the acid anhydride. It is more preferable to use the copolymer of the acryl monomer, the aromatic vinyl monomer and the acrylonitrile monomer; the copolymer of the acryl monomer, the aromatic vinyl monomer and the acid anhydride; or the copolymer of the acryl monomer, the aromatic vinyl monomer, the acrylonitrile monomer and the acid anhydride.

In the case of when the copolymer of the acryl monomer, the aromatic vinyl monomer and the acrylonitrile monomer or the copolymer of the acryl monomer, the aromatic vinyl monomer and the acid anhydride is used as the matrix resin, it is preferable that the weight ratio of each of the monomers be in the range of 55 to 80:10 to 35:4 to 15. Examples of the monomers are the same as those of the components that are described in respects to the acryl resin among the graft copolymers. The acryl monomer may contribute to optical properties, the aromatic vinyl monomer may contribute to the formability and the retardation provision of the film, and the acrylonitrile monomer and the acid anhydride may contribute to the heat resistance. The matrix resin may be polymerized by using the method that is known in the art, and for example, the bulk polymerization method may be used.

The copolymer that constitutes the acryl resin acting as the matrix may further include one or more monomers selected from the (meth)acrylic acid and imide monomers as an additional comonomer. The acrylic acid and methacrylic acid or a derivative thereof may be used as the (meth)acrylic acid. The phenyl maleimide, cyclohexyl maleimide and the like may be used as the imide monomer. In the case of when the (meth) acrylic acid and imide monomers are included, it is preferable that the amount be 15 parts by weight or less based on 100 parts by weight of the copolymer.

The above-mentioned matrix resin is characterized in that the glass transition temperature is in the range of 120 to 130° C., the molecular weight is in the range of 120000 to 150000, the MI (220° C., 10 kg) is 10 or less, and preferably 4 to 10, and the haze is in the range of 0.1 to 2%. The MI is an index that illustrates the flow of the resin and means an amount of the resin per minute when a load of 10 kg is applied at 220° C. In addition, the matrix resin has the refractive index in the range of preferably 1.48 to 1.545 and more preferably 1.485 to 1.535 in order to obtain the transparency required in the optical film.

The optical film according to the present invention may be manufactured by forming a film using the resin composition including the graft copolymer and the acryl resin.

The method of forming the film may be performed by using a method that is known in the art. The optical film according to the present invention may be manufactured by an extrusion process in addition to a casting process unlike the film that is made of the acryl resin.

In order to manufacture the optical film, a general additive, for example, a plasticizer, a lubricant, an impact buffering material, a stabilizing agent, a ultraviolet ray absorption agent and the like, may be added to the resin composition. In particular, in the case of when the optical film according to the present invention is used as a protective film of a polarizer, in order to protect the polarizer and the liquid crystal panel from the external ultraviolet rays, it is preferable to add the ultraviolet ray absorbing agent to the resin composition. Examples of ultraviolet ray absorbing agent may include, but are not limited to a benzotriazole ultraviolet ray absorbing agent and a triazine ultraviolet ray absorbing agent, and a hindered amine light stabilizer such as bis(2,2,6,6-tetramethyl-4-piperidyl) sebaceate may be used. Preferably, Tinuvin 328, Tinuvin 321 and Tinuvin 360 may be used. Igafos 168, Iganox 1076, and Iganox 245 may be added as the thermal stabilizing aagent.

The thickness of the optical film according to the present invention may be in the range of 20 to 200 μm, and preferably 40 to 120 μm. In the optical film according to the present invention, a glass transition temperature is in the range of 110 to 130° C., a thermal deformation temperature (Vicat) is in the range of 110 to 140° C., an MI (220° C., 10 kg) is in the range of 2 to 6, and the toughness is excellent. In addition, the case of the optical film according to the present invention, preferably, a thermal expansion coefficient CTE (ppm/K, 40 to 90° C.) is in the range of 50 to 120, a haze is in the range of 0.5 to 3%, and a transmittance is in the range of 88 to 93%.

In the optical film according to the present invention, an in-plane retardation value and a thickness retardation value may be in the range of 0 to 10 nm before the stretching and in the case of when the film is uniaxially or biaxially stretched, the in-plane retardation value and the thickness retardation value may be in the range of 80 to 200 nm.

The stretching process of the optical isotropic film is performed at a temperature range of preferably Tg−30° C. to Tg+30° C. and more preferably Tg−10° C. to Tg+20° C. based on the glass transition temperature (Tg) of the resin composition. In addition, the stretching speed and the stretching ratio may be appropriately controlled in the range capable of achieving the object of the present invention.

The optical film according to the present invention may be used as a polarizer protective film. In this case, the surface may be reformed in order to improve the adhesion strength. Examples of the reforming method include a method of treating a surface of the protective film by using corona treatment, plasma treatment, and UV treatment, and a method of forming a primer layer on the surface of the protective film. Both the methods may be used simultaneously. The type of the primer is not limited, but it is preferable to use the compound having the reactive functional group such as a silnae coupling agent.

The polarizing plate that includes the optical film awarding to the present invention as the protective film includes a polarizer and a protective film provided on at least one side of the polarizer, and at least one of the protective films may have a structure that is the optical film according to the present invention.

In the present invention, any polarizer may be used as long as the polarizer is known in the art, and for example, a film which contains iodine or dichromatic dyes and is made of polyvinyl alcohol (PVA) may be used. The polarizer may be produced by applying iodine or dichromatic dyes on the PVA film. However, the production method of the polarizing plate is not limited. In the specification, the polarizer does not include the protective film, and the polarizing plate includes the polarizer and the protective film.

The adhesion of the polarizer and the protective film may be performed by using an adhesive layer. Examples of the adhesive which is capable of being used to combine the protective film and the polarizing plate are not limited as long as the adhesive is known in the art. Examples of the adhesive include, but are not limited to a one- or two-liquid type polyvinyl alcohol (PVA) adhesive, a polyurethane adhesive, an epoxy adhesive, a styrene-butadiene rubber (SBR) adhesive, a hot melt adhesive and the like.

Among the adhesives, it is preferable to use a polyvinyl alcohol adhesive. In particular, it is preferable to use the adhesive that includes the polyvinyl alcohol resin having the acetacetyl group and the amine metal compound crosslinking agent. The adhesive for the polarizing plate may include 100 parts by weight of the polyvinyl alcohol resin having the acetacetyl group and the 1 to 50 parts by weight of the the amine metal compound crosslinking agent.

The polyvinyl alcohol resin is not limited as long as the resin is capable of desirably attaching the polarizer and the protective film to each other, and has excellent optical penetration and no consecutive change such as yellowing. In consideration of the desirable crosslinking reaction to the crosslinking agent, it is preferable to use the polyvinyl alcohol resin containing the acetacetyl group.

The degree of polymerization and saponification of the polyvinyl alcohol resin are not limited as long as the polyvinyl alcohol resin contains the acetacetyl group, but it is preferable that the degree of polymerization be 200 to 4,000 and the degree of saponification be 70 to 99.9 mol %. In consideration of the desirable mixing to the contained material according to the free movement of molecules, it is more preferable that the degree of polymerization is 1,500 to 2,500 and the degree of saponification is 90 to 99.9 mol %. In connection with this, it is preferable that the polyvinyl alcohol resin contain 0.1 to 30 mol % of acetacetyl group. In the above-mentioned range, the reaction to the crosslinking agent may be desirably performed and the adhesive may have the desired waterproofing property and adhesion strength.

The amine metal compound crosslinking agent is a water-soluble crosslinking agent that contains a functional group having a reactivity to the polyvinyl alcohol resin, and preferably, a metal complex containing an amine ligand. Examples of metal that is capable of being applied to the metal complex include a transition metal such as Zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), and platinum (Pt). Examples of the ligand that is coupled with the central metal may include any ligand as long as the ligand contains at least one amine group such as primary amines, secondary amines (diamines), tertiary amines, or ammonium hydroxides. It is preferable that the amount of the crosslinking agent be 1 to 50 parts by weight based on 100 parts by weight of polyvinyl alcohol resin. In the above-mentioned range, it is possible to provide significant adhesion strength to the target adhesive and to improve the storage stability (pot life) of the adhesive.

It is preferable that the pH of the adhesive aqueous solution including the polyvinyl alcohol resin containing the acetacetyl group and the amine metal compound crosslinking agent be controlled to 9 or less using a pH controlling agent. More preferably, the pH may be controlled to more than 2 and 9 or less, and even more preferably, 4 to 8.5.

The combination of the polarizer and the protective film may be performed according to an attachment method using an adhesive. That is, the adhesive is applied on the surface of the PVA film that is the protective film of the polarizer or the polarizer by using a roll water, a gravure water, a bar water, a knife water, a capillary water, or the like. Before the adhesive is completely dried, the protective film and the polarizing film are combined with each other using heat pressing or pressing at normal temperature by means of a combination roll. When a hot melt type adhesive is used, the heat pressing roll is used.

If the polyurethane adhesive is to be used, it is preferable to use the polyurethane adhesive produced by using an aliphatic isocyanate compound which does not cause yellowing due to light. If an one- or two-liquid type dry laminate adhesive or an adhesive having relatively low reactivity in respects to isocyanate and a hydroxy group is used, a solution type adhesive which is diluted with an acetate solvent, a ketone solvent, an ether solvent, or an aromatic solvent may be used. In this connection, it is preferable that the adhesive have low viscosity of 5000 cps or less. Preferably, the adhesive has excellent storage stability and light transmittance of 90% or more at a wavelength of 400 to 800 nm.

If showing sufficient tackifying power, a tackifier may be used for the lamination of the protective film and the polarizing film. If used, a tackifier is preferably heat- or UV-cure sufficiently to show resulting mechanical strength as high as that obtained with an adhesive. Also, the interface adhesion of the tackifier useful in the present invention is large enough so that delamination is possible only when one of the films bonded to each other therethrough is destroyed.

Specific examples of the tackifier may include natural rubber, synthetic rubber, or elastomer, a vinyl chloride/vinyl acetate copolymer, polyvinyl alkyl ether, polyacrylate, modified polyolefin adhesive having excellent optical transparency, and a curable tackifier containing a airing agent such as isocyanate.

The manufactured polarizing plate may be used for the various purposes. Specifically, the polarizing plate may be preferably applied to an image display device such as a polarizing plate for liquid crystal displays (LCD) and a polarizing plate for preventing the reflection of the organic EL display device. In addition, the optical film according to the present invention may be applied to a complex polarizing plate in which various optical layers stub as various types of functional layers, for example, a retardation plate such as a λ/4 plate and a λ/2 plate, an optical diffusion plate, a viewing angle enlargement plate, a luminance improvement plate, and a reflection plate are combined with each other.

The polarizing plate may include an tackifier layer on at least one side thereof so as to be easily applied to image display devices and the like. In addition, the polarizing plate may further include a release film on the tackifier layer in order to protect the tackifier layer until the polarizing plate is applied to an image display device.

In addition, the present invention provides an electronic device that includes the optical film or the retardation film. The electronic device may be an image display device such as LCDs. For example, the present invention provides an image display device that includes a light source, a first polarizing plate, a liquid crystal cell, and a second polarizing plate sequentially layered, and also includes the optical film or the retardation film according to the present invention as at least one protective film of the first polarizing plate and the second polarizing plate or the retardation film that is provided between at least one of the first polarizing plate and the second polarizing plate and the liquid crystal cell.

The liquid crystal cell includes a liquid crystal layer; a substrate that is capable of supporting the liquid crystal layer; and an electrode layer to apply voltage to the liquid crystal. At this time, the optical film or the retardation film according to the present invention may be applied to a liquid crystal mode such as an In-Plane Switching mode (IPS mode), a Vertically Aligned mode (VA mode), an OCB mode (Optically Compensated Birefringence mode), a Twisted Nematic mode (TN mode), and a Fringe Held Switching mode (FFS mode).

MODE FOR THE INVENTION

A better understanding of the present invention may be obtained in light of the following Examples which are set forth to illustrate, but are not to be construed to limit the present invention.

EXAMPLE 1

The resin composition that included 80% by weight of the matrix resin in which the ratio of SM-MMA-MAH (styrene-methyl methacrylate-maleic anhydride) was 23:70:7% by weight and the weight average molecular weight was 130000, and 20% by weight of the impact buffering material that had the molecular weight of 130000 except for the rubber and the ratio of the core (butadiene rubber) and shell (SM-MMA-AN=25:70:5) that was 25:75 was subjected to dry blending to manufacture the heat resistant blend of pellet state by using the unidirectional two-axis extrusion device. After the manufactured pellet was dried, the extruded film having the thickness of 80 μm was manufactured by using the extrusion device including the T-die. The physical properties of the manufactured film were measured, and the results are described in the following Table 1.

EXAMPLE 2

The physical properties of the film were measured by using the same method as that of Example 1, except that the resin composition that included 75% by weight of the matrix resin in which the ratio of SM-MMA-MAH (styrene-methyl methacrylate-maleic anhydride) was 23:70:7% by weight and the weight average molecular weight was 130000, and 25% by weight of the impact buffering material that had the molecular weight of 130000 except for the rubber and the ratio of the core and shell that was 25:75 was used, and the results are described in the following Table 1.

EXAMPLE 3

The physical properties of the film were measured by using the same method as that of Example 1, except that the resin composition that included 80% by weight of the matrix resin in which the ratio of SM-MMA-MAH (styrene-methyl methacrylate-maleic anhydride) was 23:70:7% by weight and the weight average molecular weight was 130000, and 20% by weight of the impact buffering material that had the molecular weight of 130000 except for the rubber and the ratio of the core and shell that was 30:70 was used, and the results are described in the following Table 1.

EXAMPLE 4

The physical properties of the film were measured by using the same method as that of Example 1, except that the resin composition that included 75% by weight of the matrix resin in which the ratio of SM-MMA-MAH (styrene-methyl methacrylate-maleic anhydride) was 23:67:10% by weight and the weight average molecular weight was 130000, and 25% by weight of the impact buffering material that had the molecular weight of 130000 except for the rubber and the ratio of the core and shell that was 30:70 was used, and the results are described in the following Table 1.

EXAMPLE 5

The physical properties of the film were measured by using the same method as that of Example 1, except that the resin composition that included 80% by weight of the matrix resin in which the ratio of SM-MMA-MAH (styrene-methyl methacrylate-maleic anhydride-acrylonitrile) was 23:65:7:5% by weight and the weight average molecular weight was 130000, and 20% by weight of the impact buffering material that had the molecular weight of 130000 except for the rubber and the ratio of the core and shell that was 30:70 was used, and the results are described in the following Table 1.

EXAMPLE 6

The physical properties of the film were measured by using the same method as that of Example 1, except that the resin composition that included 70% by weight of the matrix resin in which the ratio of SM-MMA-CHMI (styrene-methyl methacrylate-cyclohexylmaleimide) was 23:70:7% by weight and the weight average molecular weight was 130000, and 30% by weight of the impact buffering material that had the molecular weight of 130000 except for the rubber and the ratio of the core and shell that was 20:80 was used, and the results are described in the following Table 1.

EXAMPLE 7

The physical properties of the film were measured by using the same method as that of Example 1, except that the resin composition that included 80% by weight of the matrix resin in which the ratio of SM-MMA-MAH (styrene-methyl-methacrylate-maleic anhydride) was 23:70:7% by weight and the weight average molecular weight was 130000, and 20% by weight of the impact buffering material that had the molecular weight of 130000 except for the rubber and the ratio of the core and shell that was 40:60 was used, and the results are described in the following Table 1.

EXAMPLE 8

The physical properties of the film were measured by using the same method as that of Example 1, except that the resin composition that included 80% by weight of the matrix resin in which the ratio of SM-MMA-MAH (styrene-methylmethacrylate-maleic anhydride) was 23:70:7% by weight and the weight average molecular weight was 130000, and 20% by weight of the impact buffering material that had the molecular weight of 130000 except for the rubber and the ratio of the core and shell that was 50:50 was used, and the results are described in the following Table 1.

COMPARATIVE EXAMPLE 1

The physical properties of the film were measured by using the same method as that of Example 1, except that the resin composition that included 90% by weight of the matrix resin in which the ratio of SM-MMA-MAH (styrene-methylmethacrylate-maleic anhydride) was 23:70:7% by weight and the weight average molecular weight was 130000, and 10% by weight of the impact buffering material that had the molecular weight of 130000 except for the rubber and the ratio of the core and shell that was 30:70 was used, and the results are described in the following Table 2.

COMPARATIVE EXAMPLE 2

The physical properties of the film were measured by using the same method as that of Example 1, except that the resin composition that included 60% by weight of the matrix resin in which the ratio of SM-MMA-MAH (styrene-methylmethacrylate-maleic anhydride) was 23:70:7% by weight and the weight average molecular weight was 130000, and 40% by weight of the impact buffering material that had the molecular weight of 130000 except for the rubber and the ratio of the core and shell that was 30:70 was used, and the results are described in the following Table 2.

COMPARATIVE EXAMPLE 3

The physical properties of the unstretched TAC film (thickness 80 μm, Fuji film) were measured by using the same method as Example 1, and the results are described in the following Table 2.

TABLE 1

| | | Example No. | | | | | | | |
|---|---|---|---|---|---|---|---|---|---|
| | | 1 | 2 | 3 | 4 | 5 | 6 | 7 | 8 |
| Tg (° C.) | | 120 | 119 | 118 | 125 | 116 | 117 | 115 | 118 |
| Haze (%) | | 0.9 | 1.2 | 1.1 | 1.5 | 1.1 | 1.3 | 1.6 | 2.3 |
| Toughness | | ○ | ○ | ○ | ○ | ○ | ○ | ○ | ○ |
| Straight transmittance (%) | | 92 | 91 | 90 | 90 | 90 | 91 | 89 | 88 |
| Retardation before stretching | $R_{in}$ | 1 | 1 | 1 | 1 | 1 | 1 | 1 | 1 |
| | $R_{th}$ | 7 | 8 | 7 | 9 | 9 | 7 | 9 | 8 |
| Retardation after stretching | $R_{in}$ | 150 | 148 | 150 | 150 | 165 | 130 | 120 | 100 |
| | $R_{th}$ | 150 | 150 | 150 | 150 | 170 | 130 | 120 | 110 |
| Thermal expansion coefficient (CTE) | | 82 | 89 | 86 | 100 | 85 | 90 | 110 | 150 |

TABLE 2

| | | Comparative Example No. | | |
|---|---|---|---|---|
| | | 1 | 2 | 3 |
| Tg (° C.) | | 123 | 107 | 130 |
| Haze (%) | | 0.7 | 2.8 | 0.3 |
| Toughness | | X | ○ | ○ |
| Straight transmittance (%) | | 93 | 87 | 92 |
| Retardation before stretching | $R_{in}$ | 1 | 1 | 1 |
| | $R_{th}$ | 7 | 8 | −50 |
| Retardation after stretching | $R_{in}$ | 120 | 120 | |
| | $R_{th}$ | 150 | 121 | |
| Thermal expansion coefficient (CTE) | | 79 | 160 | 40 |

(1) Measurement of the haze and the straight transmissivity—The measurement was performed by using the ASTM 1003 method.

(2) Toughness—The measurement was performed by folding using hands the film having the thickness of 80 μm ten times to check the breaking (○: No breaking Δ: the breaking occurs one to three times, and X: the breaking occurs four or more times).

(3) Tg (glass transition temperature)—The measurement was performed by using Pyris 6 DSC (Differential Scanning Calroimeter) that was manufactured by Perkin Elmer, Inc.

(4) Retardation—The refractive index was measured by using the Abbe refractometer and the calculation was performed by using the sample-gradient type automatic double refraction device according to the following Equations.

$$R_{in}=d\times(n_x-n_y)$$

$$R_{th}=d\times(n_z-n_y)$$

(wherein, d is the thickness of the film, $n_x$ is the x-axis direction refractive index of the in-plane refractive index, $n_y$ is the y-axis direction refractive index of the in-plane refractive index, and $n_z$ is the thickness direction refractive index)

(5) Thermal expansion coefficient (CTE)—The measurement was performed while the temperature of the film was increased by using the DMA device.

As shown in Table 1, the optical films that were manufactured in Examples 1 to 8 had the excellent toughness and the glass transition temperature of 115° C. or more, and the glass transition temperature was not reduced. In addition, the optical films that were manufactured in Examples 1 to 8 had the excellent optical isotropic property before the stretching and the uniform and stable retardation was obtained after the stretching. On the other hand, as shown in Table 2, in Comparative Example 1 in which the graft copolymer including the conjugated diene rubber is used in a small amount, it was impossible to obtain the sufficient toughness. In addition, there were problems in that in Comparative Example 2 in which the graft copolymer including the conjugated diene rubber is used in an excessive amount, the haze was significantly increased and the glass transition temperature was significantly reduced.

The invention claimed is:

1. A method of manufacturing an optical film, the method comprising:
   a) preparing a resin composition that comprises a first acrylic resin, and 20 to 65 parts by weight of a graft copolymer comprising a conjugated diene rubber component based on 100 parts by weight of the first acrylic resin; and
   b) forming a film having an in-plane retardation value and a thickness retardation value of 0 to 10 nm before stretching, and having an in-plane retardation value and a thickness retardation value of 80 to 200 nm after stretching, by using the resin composition:
   wherein the first acrylic resin comprises one or more copolymers selected from the group consisting of a copolymer of an acrylic monomer, an aromatic vinyl monomer and an acid anhydride represented by Formula 2; and a copolymer of an acrylic monomer, an aromatic vinyl monomer, an acrylonitrile monomer and an acid anhydride represented by Formula 2,
   wherein the graft copolymer is a graft copolymer of a conjugated diene rubber and a second acrylic resin,
   wherein the graft copolymer has a core-shell structure in which the conjugated diene rubber constitutes a core and the second acrylic resin constitutes a shell,
   wherein a weight ratio of the conjugated diene rubber and the second acrylic resin is 10 to 50:90 to 50,

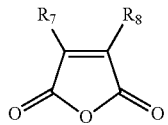

[Formula 2]

wherein R7 and R8 are each independently a hydrogen atom or an alkyl group having 1 to 6 carbon atoms.

2. The method of manufacturing an optical film as set forth in claim 1, wherein the optical film has a glass transition temperature of 110 to 130° C., a heat deflection temperature (Vicat) of 110 to 140° C., an MI (220° C., 10 kg) of 2 to 6, a thermal expansion coefficient CTE (ppm/K, 40 to 90° C.) of 50 to 120, a haze of 0.5 to 3%, and a transmittance of 88 to 93%.

3. The method of manufacturing an optical film as set forth in claim 1, wherein the conjugated diene rubber comprises one or more selected from the group consisting of an ethylene-propylene diene rubber and a butadiene rubber.

4. The method of manufacturing an optical film as set forth in claim 1, wherein the second acrylic resin comprises one or more selected from the group consisting of a homo or copolymer of an acryl monomer; a copolymer of an acryl monomer and an aromatic vinyl monomer; a copolymer of an acryl monomer, an aromatic vinyl monomer and an acrylonitrile monomer; a copolymer of an acryl monomer, an aromatic vinyl monomer and an acid anhydride; and a copolymer of an acryl monomer, an aromatic vinyl monomer, an acrylonitrile monomer and an acid anhydride.

5. A method of manufacturing a retardation film, the method comprising:
   a) preparing a resin composition that comprises a first acrylic resin, and 20 to 65 parts by weight of a graft copolymer comprising a conjugated diene rubber component based on 100 parts by weight of the first acrylic resin;
   b) forming a film having an in-plane retardation value and a thickness retardation value of 0 to 10 nm by using the resin composition; and
   c) uniaxially or biaxially stretching the film to be a film having an in-plane retardation value and a thickness retardation value of 80 to 200 nm;
   wherein the first acrylic resin comprises one or more copolymers selected from the group consisting of a copolymer of an acrylic monomer, an aromatic vinyl monomer and an acid anhydride represented by Formula 2; and a copolymer of an acrylic monomer, an aromatic vinyl monomer, an acrylonitrile monomer and an acid anhydride represented by Formula 2,
   wherein the graft copolymer is a graft copolymer of a conjugated diene rubber and a second acrylic resin,
   wherein the graft copolymer has a core-shell structure in which the conjugated diene rubber constitutes a core and the second acrylic resin constitutes a shell,
   wherein a weight ratio of the conjugated diene rubber and the second acrylic resin is 10 to 50:90 to 50,

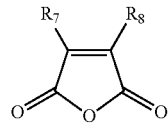

[Formula 2]

wherein R7 and R8 are each independently a hydrogen atom or an alkyl group having 1 to 6 carbon atoms.

* * * * *